United States Patent
Lee et al.

(10) Patent No.: US 12,475,557 B2
(45) Date of Patent: Nov. 18, 2025

(54) METHOD AND APPARATUS FOR DETERMINING LEVEL OF AIRWAY REGION

(71) Applicants: CORELINE SOFT CO., LTD., Seoul (KR); The Asan Foundation, Seoul (KR); UNIVERSITY OF ULSAN FOUNDATION FOR INDUSTRY COOP, Ulsan (KR)

(72) Inventors: Sang Min Lee, Seoul (KR); Joon Beom Seo, Seoul (KR); Seongeun Ahn, Seoul (KR); Donghoon Yu, Gimpo-si (KR); Seungbin Bae, Goyang-si (KR); Jihye Yun, Seoul (KR)

(73) Assignees: CORELINE SOFT CO., LTD., Seoul (KR); THE ASAN FOUNDATION, Seoul (KR); UNIVERSITY OF ULSAN FOUNDATION FOR INDUSTRY COOPERATION, Ulsan (KR)

( * ) Notice: Subject to any disclaimer, the term of this patent is extended or adjusted under 35 U.S.C. 154(b) by 397 days.

(21) Appl. No.: 18/091,828

(22) Filed: Dec. 30, 2022

(65) Prior Publication Data
US 2023/0298168 A1    Sep. 21, 2023

(30) Foreign Application Priority Data
Mar. 18, 2022   (KR) .................. 10-2022-0034332

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/20021* (2013.01); *G06T 2207/20044* (2013.01); *G06T 2207/30061* (2013.01)

(58) Field of Classification Search
CPC ......... G06T 7/0012; G06T 7/11; G06T 7/155; G06T 2207/20021; G06T 2207/20044;
(Continued)

(56) References Cited

U.S. PATENT DOCUMENTS

| 10,282,844 B2 | 5/2019 | Wang et al. |
| 2007/0127800 A1* | 6/2007 | Coenen ..................... G06T 7/11 382/128 |

(Continued)

FOREIGN PATENT DOCUMENTS

JP    2015-524331 A    8/2015

OTHER PUBLICATIONS

Horsfield et al., "Morphonetry of pulmonary arteries from angiograms in chronic obstructive lung disease," Thorax, 1981, 36, 360-65.
(Continued)

*Primary Examiner* — John B Strege
(74) *Attorney, Agent, or Firm* — United One Law Group LLC; Kongsik Kim; Jhongwoo Peck

(57) ABSTRACT

Disclosed are a method of determining branching levels of a plurality of airway branch segment regions of an airway region, the method comprising: determining branching levels of a plurality of first airway branch segment regions of an airway region included in a medical image from a root to a first order based on anatomical structure information; and determining branching levels of a plurality of second airway branch segment regions of the airway region from a bottom level to the first order.

16 Claims, 10 Drawing Sheets

(58) Field of Classification Search
CPC . G06T 2207/30061; G06T 2207/10072; G06T 2207/10081; G06T 2207/10088; A61B 6/5217; A61B 6/032; A61B 5/055
See application file for complete search history.

(56) References Cited

U.S. PATENT DOCUMENTS

| | | | | |
|---|---|---|---|---|
| 2011/0243403 | A1* | 10/2011 | Mizuno | G06T 7/0012 |
| | | | | 382/128 |
| 2012/0082358 | A1* | 4/2012 | Kiraly | G06T 7/12 |
| | | | | 382/131 |
| 2017/0055876 | A1* | 3/2017 | Novak | A61B 5/0813 |
| 2018/0240232 | A1* | 8/2018 | Wang | G06T 7/11 |
| 2018/0324131 | A1* | 11/2018 | Gilad | G06F 3/048 |
| 2018/0368917 | A1 | 12/2018 | Dekel et al. | |
| 2022/0237805 | A1* | 7/2022 | Koster | G06T 7/62 |
| 2025/0017661 | A1* | 1/2025 | Higgins | A61B 1/000094 |
| 2025/0090415 | A1* | 3/2025 | Jeon | A61H 23/02 |

OTHER PUBLICATIONS

Nousias et al., "AVATREE: An open-source computational modelling framework modelling Anatomically Valid Airway TREE conformations," PLoS One 15(4), Apr. 2020.

Montesantos et al., "The Creation and Statistical Evaluation of a Deterministic Model of the Human Bronchial Tree from HRCT Images," PLos ONE 11(12), Dec. 2016.

Smith et al., "Human airway branch variation and chronic obstructive pulmonary disease," PNAS, 115(5), Jan. 2018.

Wang, "Chapter 2 Morphometry of the human respiratory system," Interface Science and Technology, vol. 5, pp. 7-30, 2005.

Tschirren et al., "Segmentation, Skeletonization, and Branchpoint Matching—A Fully Automated Quantitative Evaluation of Human Intrathoracic Airway Trees," MICCAI 2002, LNCS 2489, pp. 12-19, 2002.

\* cited by examiner

Related Art

Related Art

FIG. 8

Menu 1: Edit branching level of selected region/branch

Menu 2: Edit branching levels including branches below selected region/branch

METHOD AND APPARATUS FOR DETERMINING LEVEL OF AIRWAY REGION

CROSS-REFERENCE TO RELATED APPLICATION

This application claims priority from Korean Patent Application No. 10-2022-0034332 filed on Mar. 18, 2022.

BACKGROUND

1. Technical Field

The present invention relates generally to technology for processing medical images, and more particularly to technology for determining the branching levels of a plurality of airway branch segment regions of the airway region in accordance with a clinical diagnostic purpose.

2. Related Art

The description given in this section is intended merely to provide background information about the present invention, but does not constitute prior art.

Various efforts have been made to extract information useful for clinical diagnosis from medical images.

Attempts have been made to determine the branching levels of respective parts of the airway using results obtained by segmenting the lung region and the airway inside the lungs from a medical image or during a process of segmenting the airway.

FIG. 1 is a diagram showing results obtained by determining the branching levels of respective parts (airway branch segment) of the airway region using airway segmentation results in a prior art.

FIG. 2 is a conceptual diagram showing the results of FIG. 1 in the form of a graph.

Referring to FIGS. 1 and 2, there are shown the results of airway branching level determination obtained by a method in which the trachea area is set as a root, the level of a branch segment close to the root is set to "1," and the level of a branch segment after a branch point is increased by one each time it branches.

However, this method causes unwanted differences from the anatomical structure of the actual airway.

For example, the correct level of the branch segment regions marked with level 3 in the circles in FIG. 2 should be level 2 when an anatomical structure is taken into consideration. In FIG. 2, the regions marked with level 3 are examples showing errors in the prior art branching level determination method.

SUMMARY

The present invention has been conceived to overcome the above-described problems, and an object of the present invention is to propose a method of determining the levels of respective parts (airway branch segments) of the airway that are consistent with the anatomical structure of the airway.

An object of the present invention is to determine the levels of respective parts (airway branch segments) of the airway based on the results of the segmentation of the airway inside the lungs or during a segmentation process and calculate the statistical information and/or quantitative information of one or more regions for each level, thereby enabling clinically useful information to be extracted and used for diagnosis.

An object of the present invention is to propose a method of determining the levels of the respective branch segment of the airway based on a hybrid/modified stream ordering scheme that increases clinical usefulness by using an anatomical structure-based airway level determination method and rapidly determines the levels of respective parts of the airway by using the stream ordering scheme, which is a method of determining the orders of streams.

According to an aspect of the present invention, there is provided a method of determining branching levels of a plurality of airway branch segment regions of an airway region, executed by a computing system including a processor, the method comprising: determining branching levels of a plurality of first airway branch segment regions of an airway region included in a medical image from a root to a first order based on anatomical structure information; and determining branching levels of a plurality of second airway branch segment regions of the airway region from a bottom level to the first order.

The determining branching levels of the plurality of the first airway branch segment regions of the airway region based on the anatomical structure information may comprise determining a branching level of a respective airway branch segment region by prioritizing the anatomical structure information over whether the respective airway branch segment region of the airway region branches off from the root.

The determining branching levels of the plurality of first airway branch segment regions of the airway region based on the anatomical structure information may comprise determining a branching level of a respective airway branch segment region based on the anatomical structure information including at least one of an airway radius of the respective airway branch segment region of the airway region, a location of the respective airway branch segment region, or a branching direction of the respective airway branch segment region.

The determining branching levels of the plurality of second airway branch segment regions of the airway region from the bottom level to the first order may comprise assigning a level higher than a same level to a respective airway branch segment region in a direction from a merge point to the root wherein a plurality of airway branch segment regions of the same level in the airway region meet and merge at the merge point.

The determining branching levels of the plurality of second airway branch segment regions of the airway region from the bottom level to the first order may comprise assigning a highest one of different levels to a respective airway branch segment region in a direction from a merge point to the root wherein a plurality of airway branch segment regions of the different levels in the airway region meet and merge at the merge point.

The method may further comprise initially assigning a branching level of all of respective airway branch segment regions from the bottom level in a direction toward the root using a stream ordering scheme. In this case the determining branching levels of the plurality of second airway branch segment regions of the airway region from the bottom level to the first order may comprises adjusting the branching levels of the plurality of second airway branch segment regions of the airway region from the bottom level to the first order after determining the branching levels of the plurality of first airway branch segment regions of the airway region from the root to the first order based on the anatomical structure information.

The determining branching levels of the plurality of first airway branch segment regions of the airway region based on anatomical structure information may comprise: adjusting the initially assigned branching level so that the root has a predetermined level value; and determining branching levels of the plurality of first airway branch segment regions of the airway region except for the root by prioritizing the anatomical structure information.

The method may further comprise generating results of quantitative analysis of an anatomical structure for clinical diagnosis for each branching level of the respective airway branch segment regions of the airway region.

The method may further comprise: segmenting an organ in the medical image; and performing skeletonization on an organ segmentation image. In this case the determining branching levels of the plurality of the first airway branch segment regions and the determining branching levels of the plurality of the second airway branch segment regions may be performed based on a skeletonization image.

The method may further comprise providing an airway branching level correction menu for a preliminary result image in which the branching levels of the plurality of second airway branch segment regions of the airway region have been determined from the root to the bottom level.

In this case the airway branching level correction menu may be a menu for correcting a branching level of a selected airway branch segment region of the airway region.

The airway branching level correction menu may be a menu for collectively correcting a branching level of a selected airway branch segment region of the airway region and branching levels of airway branch segment regions having a level lower than or equal to the level of the selected airway branch segment region.

According to an embodiment of the present invention, there is provided an apparatus for determining branching levels of a plurality of airway branch segment regions of an airway region, the apparatus comprising: memory configured to store one or more instructions; and a processor configured to execute the one or more instructions. The processor is further configured to execute the one or more instructions to: determine branching levels of a plurality of first airway branch segment regions of an airway region included in a medical image from a root to a first order based on anatomical structure information; and determine branching levels of a plurality of second airway branch segment regions of the airway region from a bottom level to the first order.

The processor may be further configured to determine a branching level of a respective airway branch segment region of the plurality of the first airway branch segment regions by prioritizing the anatomical structure information over whether the respective airway branch segment region of the airway region branches off from the root.

The processor may be further configured to assign a level higher than a same level to a respective airway branch segment region in a direction from a merge point to the root wherein a plurality of airway branch segment regions of the same level in the airway region meet and merge at the merge point.

The processor may be further configured to assign a highest one of different levels to a respective airway branch segment region in a direction from a merge point to the root wherein a plurality of airway branch segment regions of the different levels in the airway region meet and merge at the merge point.

The processor may be further configured to: assign initially a branching level of all of respective airway branch segment region from the bottom level in a direction toward the root using a stream ordering scheme; adjust the initially assigned branching level so that the root has a predetermined level value; determine branching levels of the plurality of first airway branch segment regions of the airway region by prioritizing the anatomical structure information; and adjust branching levels of the plurality of second airway branch segment regions of the airway region from the bottom level to the first order after determining the branching levels of a plurality of first airway branch segment regions of the airway region from the root to the first order based on the anatomical structure information.

The processor may be further configured to execute the one or more instructions to generate results of quantitative analysis of an anatomical structure for clinical diagnosis for each branching level of the respective airway branch segment regions of the airway region.

The processor may be further configured to execute the one or more instructions to correct a branching level of a selected airway branch segment region of the airway region in response to a user input to an airway branching level correction menu.

The processor may be further configured to execute the one or more instructions to collectively correct a branching level of a selected airway branch segment region of the airway region and branching levels of airway branch segment regions having a level lower than or equal to the level of the selected airway branch segment region in response to a user input to an airway branching level correction menu.

BRIEF DESCRIPTION OF THE DRAWINGS

The above and other objects, features and advantages of the present invention will be more clearly understood from the following detailed description taken in conjunction with the accompanying drawings, in which:

FIG. 8 is a conceptual diagram showing an airway branching level editing menu according to an embodiment of the present invention;

DETAILED DESCRIPTION

Figure 1:
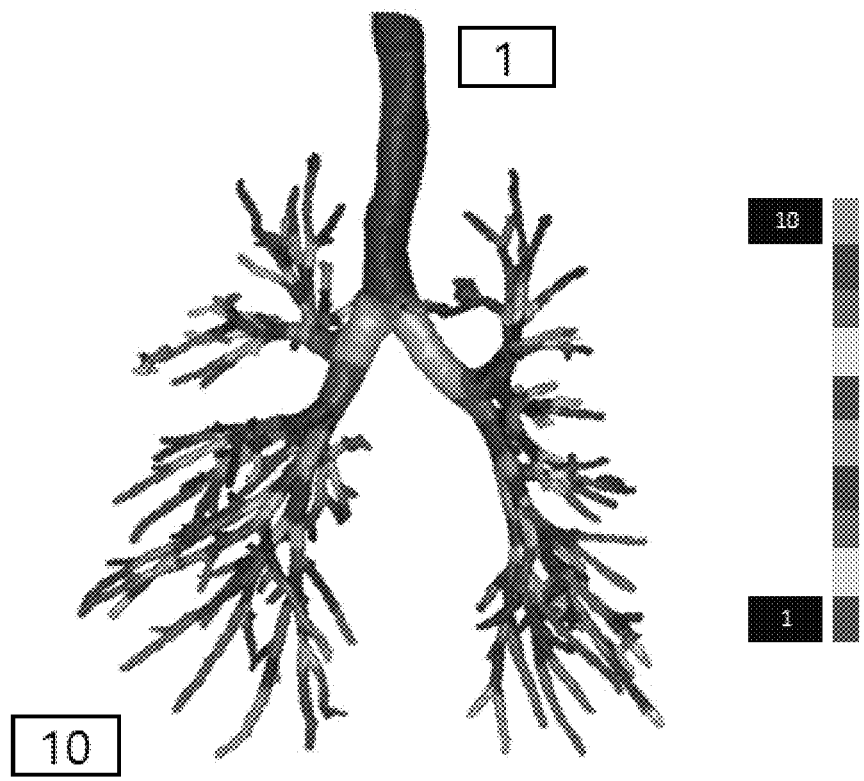
FIG. 1 is a diagram showing results obtained by determining the branching levels of respective parts of the airway region using airway segmentation results in a prior art.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Meanwhile, even if a technology is known prior to the filing date of the present disclosure, it may be included as part of the configuration of the present disclosure when necessary, and will be described herein without obscuring the spirit of the present disclosure. However, in describing the configuration of the present disclosure, a detailed description on matters that can be clearly understood by those skilled in the art as a known technology prior to the filing date of the present disclosure may obscure the purpose of the present disclosure, so excessively detailed description on the known technology will be omitted.

For example, known technologies prior to the filing of the present disclosure may be used for the implementation of the present invention such as a detection, segmentation, or classification of a specified organ of human body by processing medical images, or generating quantification information by measuring/quantifying findings or segmented organ, and the like, and at least some of these known technologies may be applied as elemental technologies required for practicing the present disclosure.

However, the purpose of the present disclosure is not to claim the rights to these known technologies, and the contents of the known technologies may be included as part of the present disclosure within the scope not departing from the spirit of the present disclosure.

Hereinafter, with reference to the accompanying drawings, preferred exemplary embodiments of the present disclosure will be described in more detail. In order to facilitate overall understanding in the description of the present disclosure, the same reference numerals are used for the same components in the drawings, and redundant descriptions of the same components are omitted.

Figure 5:
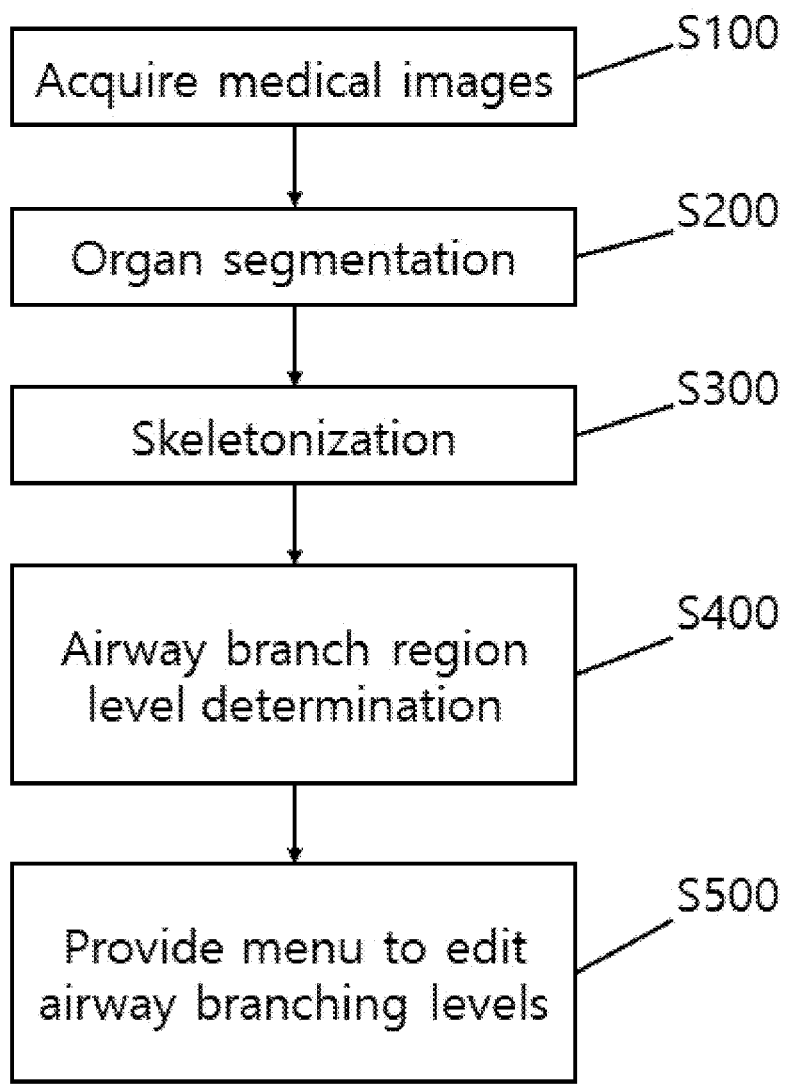
FIG. 5 is an operational flowchart showing a method for assisting medical image analysis and diagnosis, including a process of determining the branching levels of a plurality of airway branch segment regions of the airway region, according to an embodiment of the present invention.

FIG. 5 is an operational flowchart showing a method for assisting medical image analysis and diagnosis, including a process of determining the branching levels of a plurality of airway branch segment regions of the airway region, according to an embodiment of the present invention.

Figure 6:
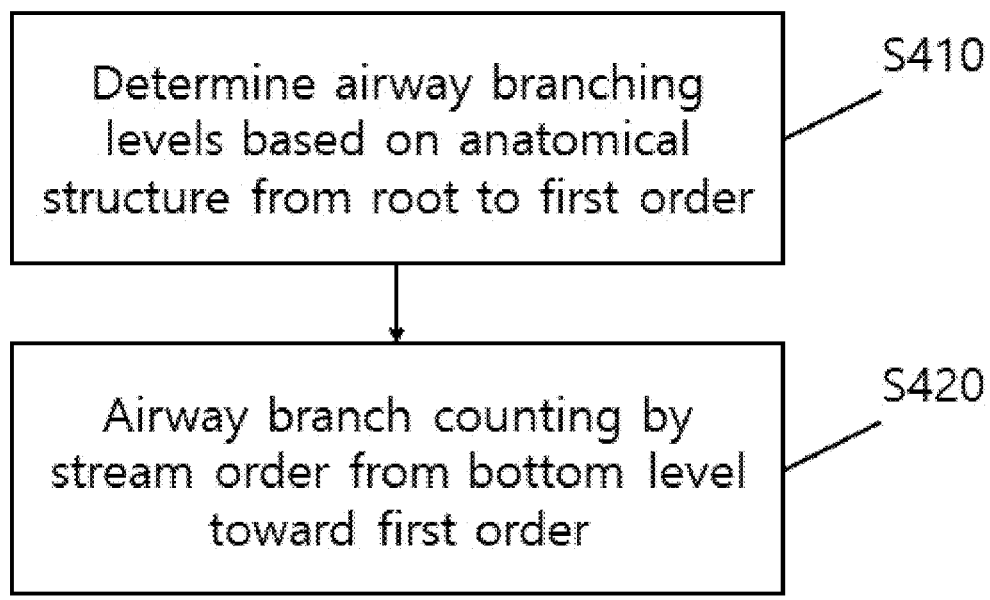
FIG. 6 is an operational flowchart showing a method of determining the branching levels of a plurality of airway branch segment regions of the airway region according to an embodiment of the present invention.

FIG. 6 is an operational flowchart showing a method of determining the branching levels of a plurality of airway branch segment regions of the airway region according to an embodiment of the present invention.

Referring the FIGS. 5 and 6, the method for assisting medical image analysis and diagnosis according to an embodiment of the present invention may include step S100 of acquiring a medical image.

The medical image refers to an image including information about an anatomical structure such as an organ in the human body. For example, it may include a computed tomography (CT) image, a magnetic resonance (MR) image, and the like. However, the medical image of the present invention is not limited to these specific modalities.

In the method for assisting medical image analysis and diagnosis according to an embodiment of the present invention, a medical image already acquired by a modality may be received using a communication interface.

The method for assisting medical image analysis and diagnosis according to an embodiment of the present invention may further include: step S200 of segmenting an organ in the medical image; and step S300 of performing skeletonization on an image of the results of the segmentation of the organ. In this case, in steps S410, S440, and S450 of determining the branching levels of a plurality of first airway branch segment regions of the airway region based on anatomical structure information, the branching levels of a plurality of second airway branch segment regions of the airway region may be determined based on an image of the results of the skeletonization of step S300.

The skeletonization refers to the process of reducing the foreground region of a binary image to a skeletal remnant, thereby preserving most of the extent and connectivity of the original region while discarding most original foreground pixels.

The skeletonization provides compact yet effective representations of two-dimensional (2D) and three-dimensional (3D) objects, which are useful for many low- and high-level image-related tasks, including object representation, retrieval, manipulation, matching, registration, tracking, recognition, and compression.

The method for assisting medical image analysis and diagnosis according to an embodiment of the present invention may further include step S500 of providing an airway branching level correction menu for a preliminary result image in which the branching levels of a plurality of airway branch segment regions of the airway region ranging from a root to a bottom level have been determined.

As part of FIG. 5, a method (see step S400) of determining the branching levels of a plurality of second airway branch segment regions of the airway region according to an embodiment of the present invention includes: step S410, S440, or S450 of determining the branching levels of a plurality of first airway branch segment regions of the airway region included in the medical image from the root to a first order based on anatomical structure information; and step S420, S430, or S460 of determining the branching levels of a plurality of second airway branch segment regions of the airway region from the bottom level to the first order.

In steps S410, S440, and S450 of determining the branching levels of a plurality of first airway branch segment regions of the airway region based on anatomical structure information, the branching level of a respective airway branch segment region may be determined by prioritizing the anatomical structure information over whether the respective airway branch segment region of the airway region branches off from the root.

In steps S410, S440, and S450 of determining the branching levels of a plurality of first airway branch segment regions of the airway region based on anatomical structure information, the branching level of the respective airway branch segment region may be determined based on anatomical structure information including at least one of the airway radius of the respective airway branch segment region of the airway region, the position of an airway branch, and the branching direction of the respective airway branch segment region. Furthermore, the anatomical structure information may include at least one of the ratio and/or difference between the radii of the airway branch segments, the relative position of the airway branch segment from the root, and the difference and/or angle between the upward-branching direction and downward-branching direction of the respective airway branch segment region. For example, when there is a significant difference between the radii of first and second branch segments, which branch at one branch point, the first branch segment may maintain a branching level as a main branch, and only the second branch segment may have a lower branching level. When the first branch segment has no significant difference between the upward-branching and downward-branching directions thereof and the second branch segment has a significant difference between the upward-branching and downward-branching directions thereof, the first branch may maintain a branching level as a main branch, and only the second branch may have a lower branching level.

Steps S420, S430, and S460 of determining the branching levels of a plurality of second airway branch segment regions of the airway region ranging from the bottom level to the first order may include the step of, when branch segment regions of the same level in the airway region meet and merge at one point (e.g., merge point), assigning a level higher than the same level to a respective airway branch segment region in the direction from a merge point to the root (the higher-level/upward direction).

Steps S420, S430, and S460 of determining the branching levels of a plurality of second airway branch segment regions of the airway region ranging from the bottom level to the first order may include the step of, when branch segment regions of different levels in the airway region meet and merge at one point (merge point), assigning the highest one of the different levels to a respective airway branch segment region in the direction from a merge point to the root (the higher-level/upward direction).

The method of determining the branching levels of the plurality of airway branch segment regions of the airway region according to an embodiment of the present invention may further include the step of generating the results of the quantitative analysis of an anatomical structure for clinical diagnosis for each of the branching levels of the plurality of airway branch segment regions of the airway region.

The method of determining the branching levels of the plurality of airway branch segment regions of the airway region according to an embodiment of the present invention may further include: step S200 of segmenting an organ in the medical image; and step S300 of performing skeletonization on an image of the results of the segmentation of the organ. In this case, the branching levels of the plurality of first airway branch segment regions of the airway region based on the anatomical structure information in steps S410, S440, S450, and the branching levels of the plurality of second airway branch segment regions of the airway region in steps S420, S430, and S460 may be determined based on a skeletonization image obtained in step S300.

Referring to FIG. 6 again, the method (see step S400) of determining the branching levels of a plurality of airway branch segment regions of the airway region according to an embodiment of the present invention may include: step S410 of determining branching levels of a plurality of first airway branch segment regions of the airway region included in the medical image from a root to a first order based on anatomical structure information; and step S420 of determining branching levels of a plurality of second airway branch segment regions of the airway region from a bottom level to the first order.

Figure 7:
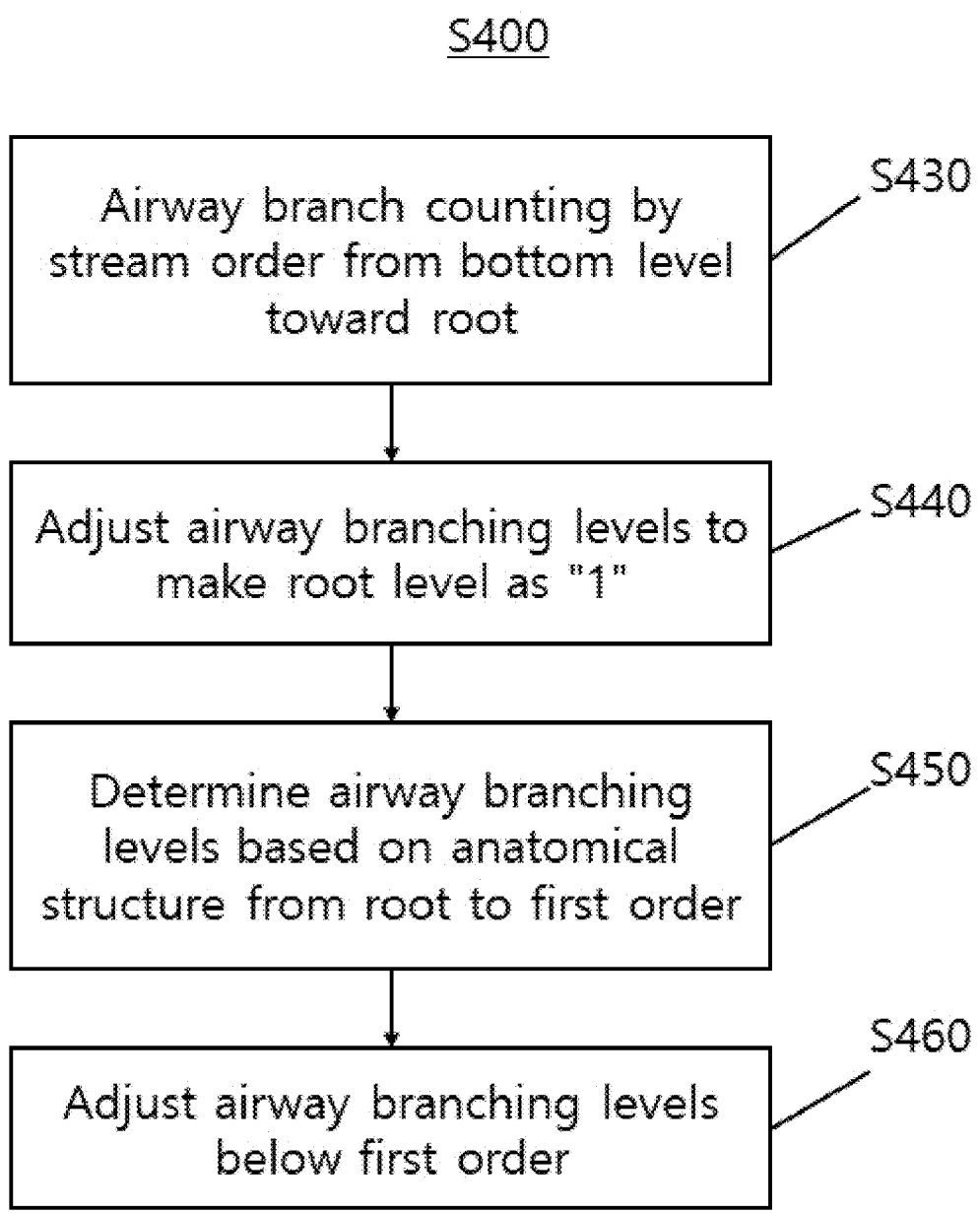
FIG. 7 is an operational flowchart showing a method of determining the branching levels of a plurality of airway branch segment regions of the airway region according to another embodiment of the present invention.

FIG. 7 is an operational flowchart showing a method of determining the branching levels of a plurality of airway branch segment regions of the airway region according to another embodiment of the present invention.

Referring to FIG. 7, the method (see step S400) of determining the branching levels of a plurality of airway branch segment regions of the airway region according to an embodiment of the present invention may further include a step S430 of initially assigning a branching level of all of the respective airway branch segment regions of the airway region from the bottom level in the direction toward the root using the modified stream ordering scheme. In this case the step S420 of determining the branching levels of a plurality of second airway branch segment regions of the airway region from the bottom level to the first order may include a step S460 of adjusting the branching levels of a plurality of second airway branch segment regions of the airway region from the bottom level to the first order after the step S410 of determining the branching levels of a plurality of first airway branch segment regions of the airway region from the root to the first order based on the anatomical structure information (see step S410, S440, and S450).

The step S410 of determining branching levels of the plurality of first airway branch segment regions of the airway region based on anatomical structure information may include: a step S440 of adjusting the initially assigned branching level so that the root has a predetermined level value (e.g., "1"); and a step S450 of determining branching levels of the plurality of first airway branch segment regions of the airway region except for the root by prioritizing the anatomical structure information.

FIG. 8 is a conceptual diagram showing an airway branching level editing menu according to an embodiment of the present invention.

The method of determining the branching levels of a plurality of airway branch segment regions of the airway region according to an embodiment of the present invention may further include step S500 of providing an airway branching level correction menu for a preliminary result image in which the branching levels of a plurality of airway branch segment regions of the airway region have been determined from the root to the bottom level.

The airway branching level correction menu provided in step S500 may be a menu for correcting the level of a selected airway branch segment region of the airway region.

The airway branching level correction menu provided in step S500 may be a menu for collectively correcting the level of a selected airway branch segment region of the airway region and the levels of regions having a level lower than or equal to the level of the selected airway branch segment region.

Figure 3:
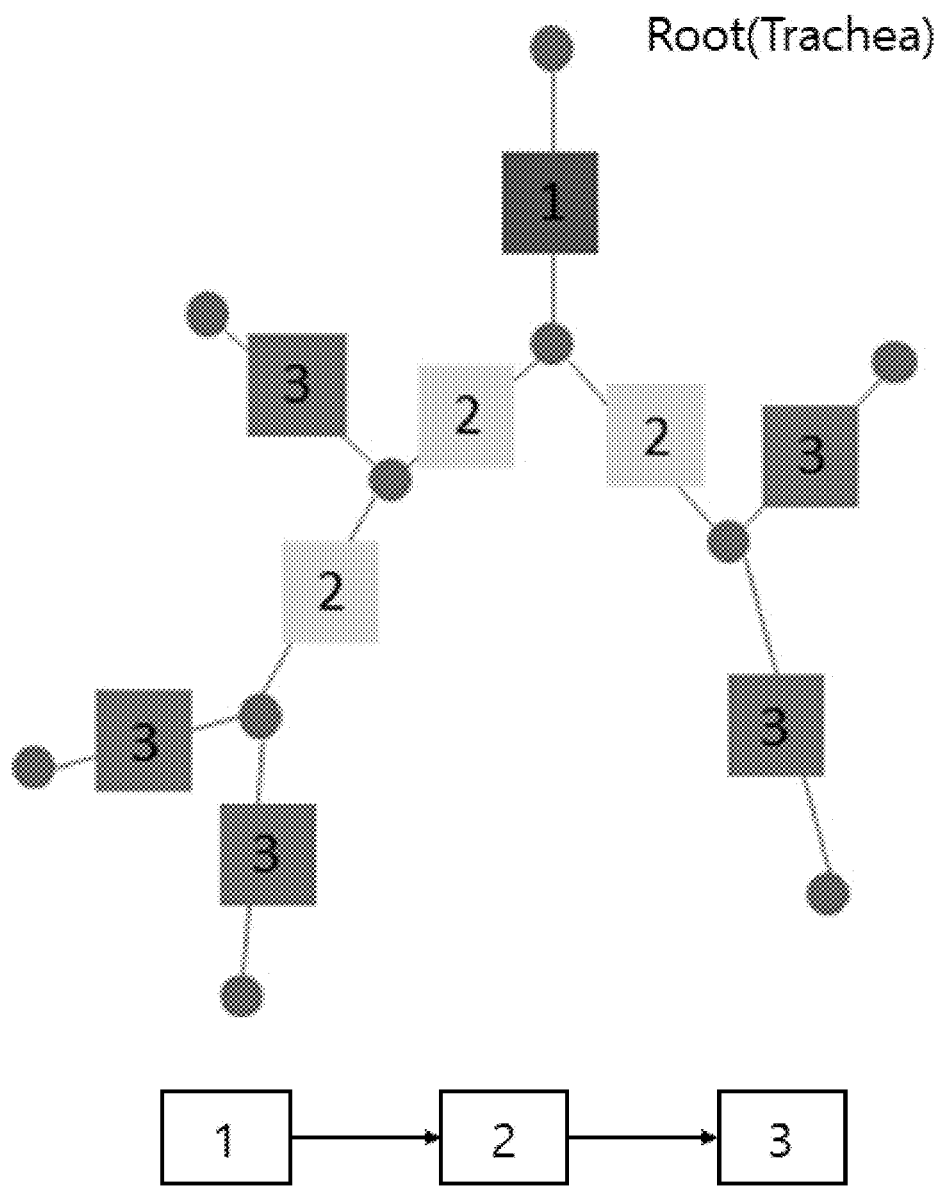
FIG. 3 is a conceptual diagram showing a process of determining the branching levels of a plurality of airway branch segment regions of the airway region based on anatomical structure information according to an embodiment of the present invention.

FIG. 3 is a conceptual diagram showing a process of determining the branching levels of a plurality of airway branch segment regions of the airway region based on anatomical structure information according to an embodiment of the present invention.

Figure 2:
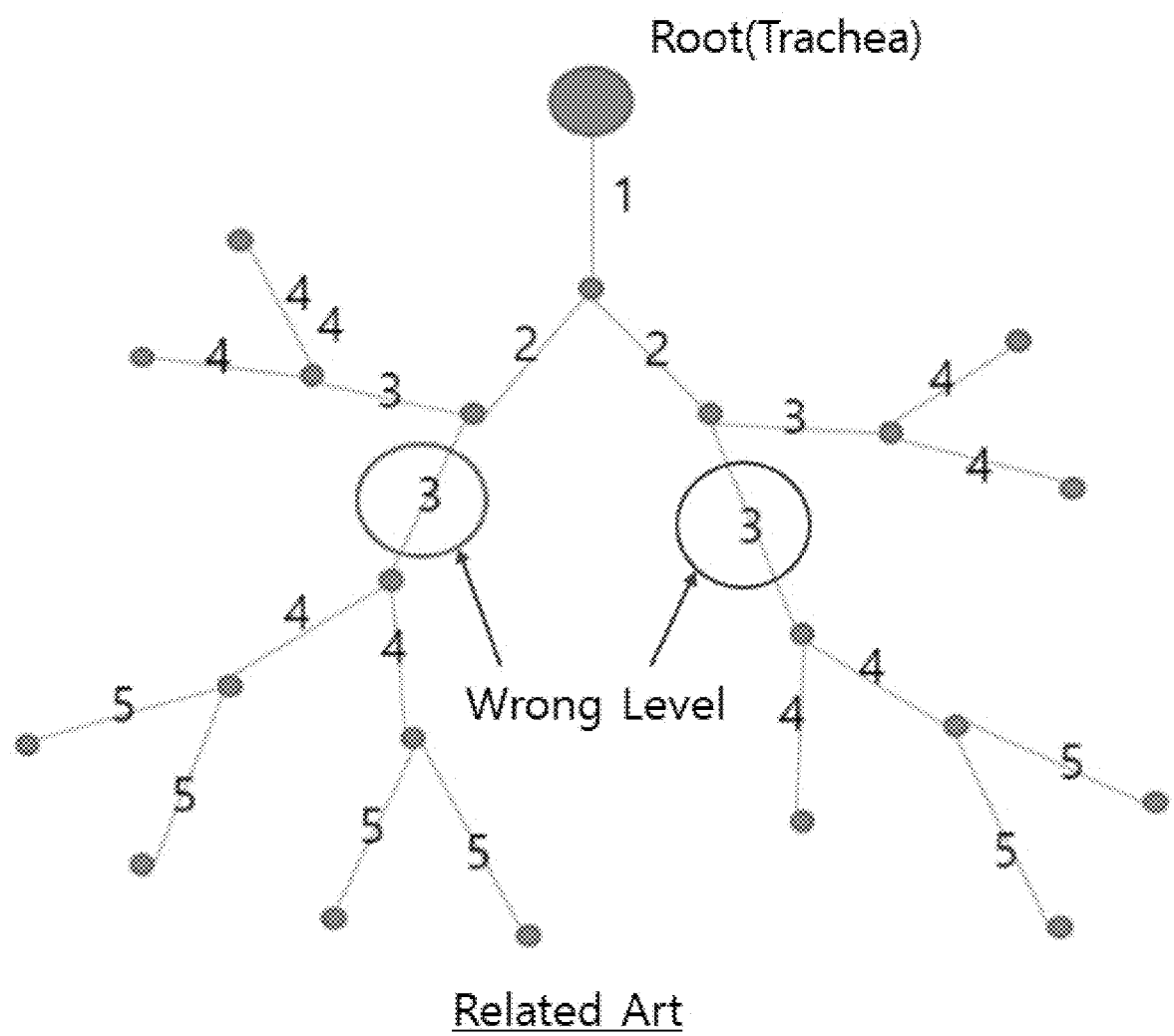
FIG. 2 is a conceptual diagram showing the results of FIG. 1 in the form of a graph.

In the prior art of FIGS. 1 and 2 above, there may be a problem in that parts that should have clearly different levels in terms of an anatomical structure are set to the same level. Alternatively, conversely, there may be a problem in that parts that should be assigned the same level in terms of an anatomical structure are assigned different levels.

Referring to FIG. 3, the simplest embodiment of the present invention is configured to assign fixed level based on anatomical structure information from the root to the first order level where there is little structural change and to apply the stream ordering scheme below that first order level in order to perform rapid calculation. In this case, the first order level may be set to, for example, level 3.

In this case, according to one embodiment of the present invention there is provided setting the first order level to level 3. Another embodiment in which only level 1 and level 2 are fixed based on anatomical structure information may also be contemplated.

Referring to FIG. 3, although branching has occurred between branch segment regions assigned preliminarily level "2," fixed level "2" may be assigned to down-ward branching branch segment region when the downward-branching airway branch segment region may be clinically determined to be the same branch as the upward-branching branch segment region based on the anatomical structure information.

As a method of implementing the embodiment of FIG. 3, two available embodiments are provided. According to the first embodiment, first, a fixed level may be assigned from the root (the trachea) to the first order (e.g., level 2 or 3) based on the anatomical structure information (see the S410 of FIG. 6), and then next stream ordering may be applied levels below the first order (see the S420 of FIG. 6). According to the second embodiment, first, stream ordering may be applied to all of the branch segments as the step S430, second, higher levels than the first order may be changed such that the highest trachea may be set to a predetermined level (e.g., "level 1") as the step S440 after the step S430 of assignment of stream orders, and then a fixed level may be assigned at a higher level than the first order based on the anatomical structure information (see the embodiment of step S4540 of FIG. 7).

In the first embodiment of FIG. 6, the levels of the trachea, the two main bronchi and the intermediate bronchus may be fixed to level 1 or 2, and then Strahler stream orders may be applied at lower levels.

In the second embodiment of FIG. 7, levels are reassigned such that the trachea may be set to level 1 after the application of Strahler stream orders and, and then a level may be fixed at a top level based on the anatomical structure information.

Although the degree of consistency with an anatomical structure is improved compared to the prior art only by the automatic order/level assignment function according to an embodiment of the present invention disclosed above, a user interface (UI) for correcting a branching level may be provided to a user in order to compensate for imperfect results that occur upon automatic order/level assignment (see step S500 of FIG. 5 and UI menu of FIG. 8).

In step S500, there may be provided a UI for, when a specific branch segment is selected and the level thereof is changed, automatically changing the levels of branch segments below the level. In this case, as shown in FIG. 8, depending on the other embodiment, only the level of a selected branch segment may be changed.

Figure 4:
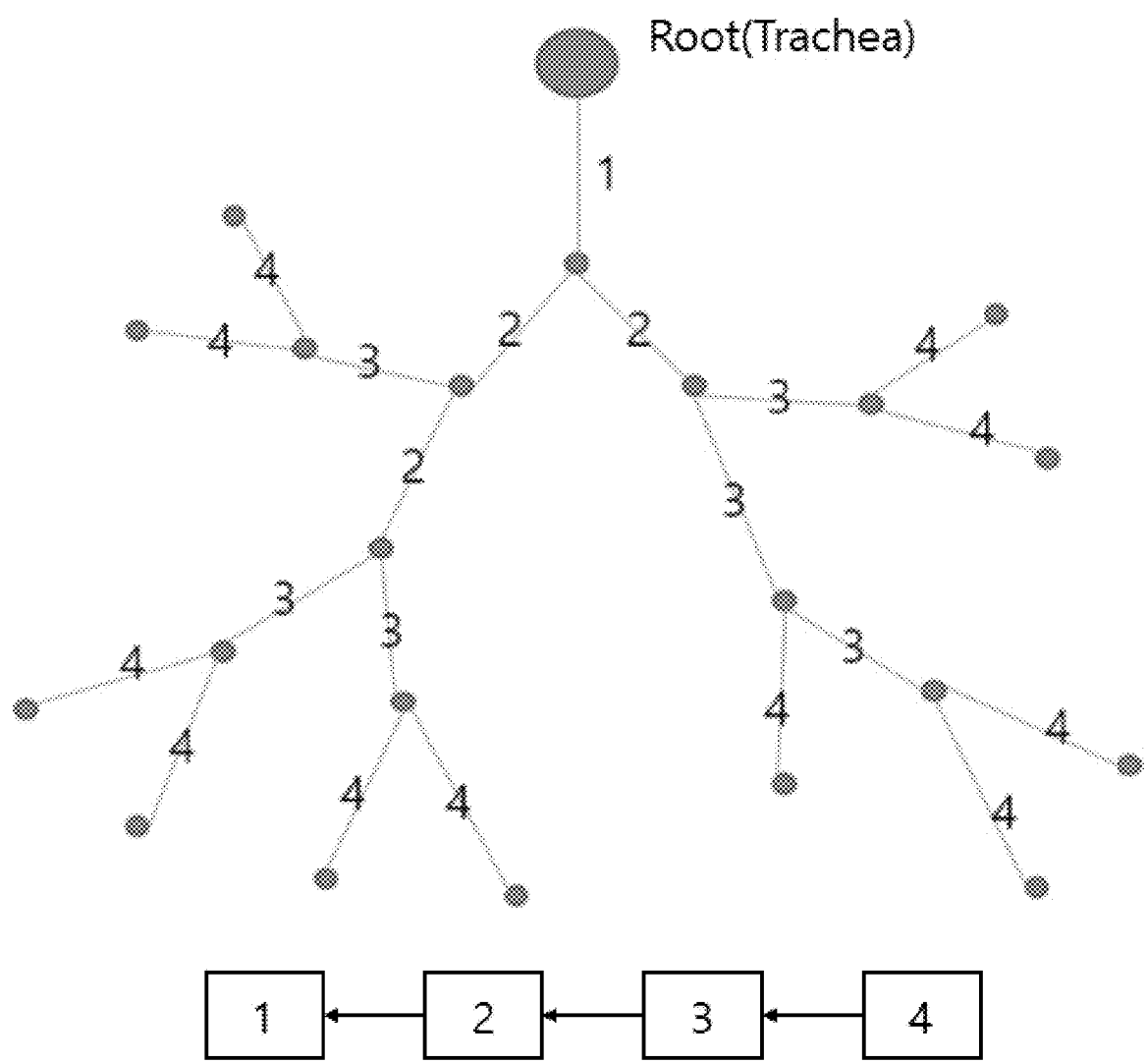
FIG. 4 is a conceptual diagram showing a process of determining the branching levels of a plurality of airway branch segment regions of the airway region based on the modified stream ordering scheme according to an embodiment of the present invention.

FIG. 4 is a conceptual diagram showing a process of determining the branching levels of a plurality of airway branch segment regions of the airway region based on the modified stream ordering scheme according to an embodiment of the present invention.

In the prior art, there was also an attempt to apply the stream ordering scheme, which is a method used to determine the orders of streams, to the determination of the levels of respective parts of the airway.

The stream ordering scheme, which is a method of determining the orders of streams, is a method of increasing the stream order number from the uppermost stream (the smallest tributary). The levels of branches may be determined by assigning level 1 to a first tributary and then increasing the level after merge by one level when branches of the same level meet each other.

When the modified stream ordering scheme is applied to the process of determining the branching levels of a plurality of airway branch segment regions of the airway region, which corresponds to the technical field of the present invention, an increase and decrease in the order number may be reversed when compared to those in the level number of the tributary of the stream. The number of the lowest level (the largest value) is determined first, and the level number is decreased (the level is raised) after a merge point when branches of the same level meet each other. Otherwise (when branches of different levels meet each other), the level may be maintained without change after a merge point (i.e., the uppermost branch number is maintained).

The degree of consistency with the anatomical structure is made superior to that of the mechanical ordering of FIGS. 1 and 2 by simply applying the stream ordering scheme.

However, in the case where only the stream ordering scheme of the prior art is applied, there is a problem of the inconsistency in that level 2 (by the anatomical structure) may become level 1 (by the stream order) depending on the structure of the actually divided airway. In other words, there is another problem may appear in the stream order in that a phenomenon different from the phenomenon of the prior art of FIGS. 1 and 2, which is the prior art related to the mechanical ordering.

In the meantime, the stream ordering scheme has the effect of reducing the time required to determine the levels of branch segments because it may be easy to perform calculation.

Therefore, the present invention may propose a hybrid method of rapidly determining the levels of branch segments by assigning branching levels to the branch segment region from the root to the first order based on anatomical structure information and applying stream ordering to levels below the first order as an embodiment while proposing a method of determining the branching levels of a plurality of second airway branch segment regions of the airway region based on anatomical structure information.

Figure 9:
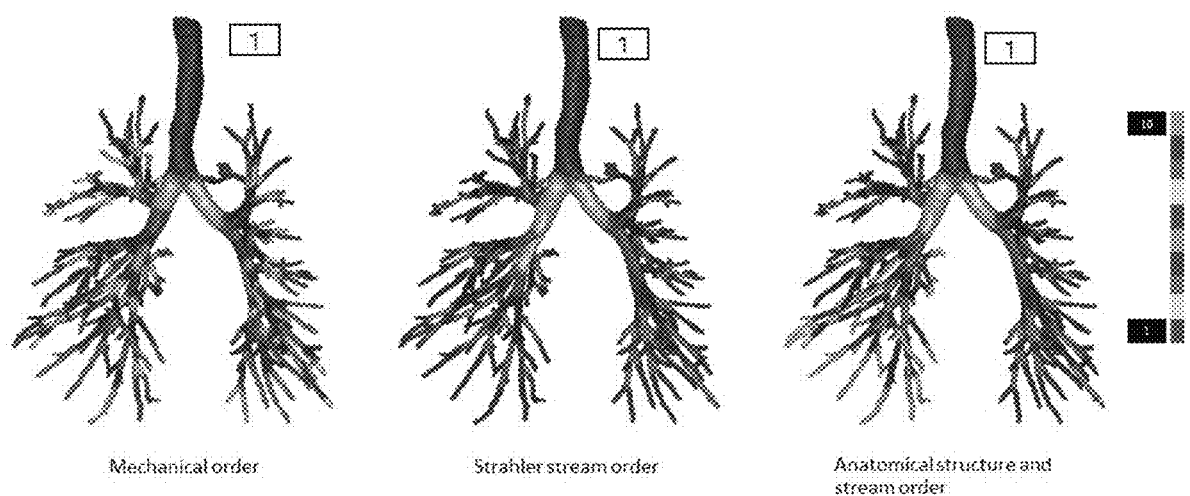
FIG. 9 is a diagram illustrating the comparisons between the method of determining the branching levels of a plurality of airway branch segment regions of the airway region according to an embodiment of the present invention and the prior art methods.

FIG. 9 is a diagram illustrating the comparisons between the method of determining the branching levels of a plurality of airway branch segment regions of the airway region according to an embodiment of the present invention and the prior art methods of determining the branching levels of a plurality of airway branch segment regions of the airway region.

The mechanical ordering of FIG. 9 shows the results of the prior art level determination of FIGS. 1 and 2. There is shown a problem in which a portion of a part that needs to be determined to be a higher level in terms of an anatomical structure is determined to be a lower level.

The Strahler stream ordering of FIG. 9 shows the results of another prior art level determination. There is shown a problem in which a portion of a part that needs to be determined to be a lower level in terms of an anatomical structure is determined to be a higher level.

The anatomical structure and modified stream ordering of FIG. 9 shows the results of airway branching level determination according to an embodiment of the present invention. There are shown the results of airway branching level determination that best match the anatomical structure.

According to the embodiment of the present invention shown in FIGS. 3 to 9, the following features may be included:
  (1) The branching levels of the human body may be analyzed through the segmentation of an organ (the airway, or the lobes of the lung), skeletonization, and modified stream ordering. In this case, the levels of various branches such as blood vessels as well as the airway may be analyzed.

Airway tree analysis is essential for the quantitative analysis of lung and airway diseases, and is a technique that may also be used for virtual bronchoscope navigation and biopsy guidance. Accordingly, these medical practices and diagnosis processes may be effectively assisted by applying the method of determining the branching levels of a plurality of airway branch segment regions of the airway region according to the present invention.
  (2) Robust analysis may be performed by fixing a branching level in the center of human body branches with little anatomical variation.

Airway segmentation=>skeletonization=In addition to analyzing the levels of body branches through stream ordering, a branching level may be fixed in the center of the body branches to obtain analysis results that are robust to anatomical variations.
  (3) An implementation may be made to include a module capable of correcting a calculated branching level.

In this case, the module capable correcting a branching level may receive input from a user through a menu appearing on a user interface and selectively, and may apply a function in response to the input from the user.

Lung lobe segmentation information is used to fix a branching level in the center of the body branches, and a calculated branching level may be corrected through a user-friendly interface.

The medical image processing/analysis method of the present invention may include a method of assigning levels or orders to respective airway sections on the assumption that the airway has been segmented from a lung medical image and the segmented airway has been segmented into branches and sections between the branches.

There is proposed a method of, when the trachea side is set to a higher-level side, assigning levels based on an anatomical structure to a plurality of sections pertaining to higher levels and assigning levels to a plurality of sections pertaining to lower levels using the stream ordering scheme.

According to the proposed method, statistics of the quantification information measured for the individual sections of the airway whose levels have been determined may be calculated. In other words, information useful for assisting clinical diagnosis may be generated by calculating statistical information for each level.

Since the results obtained by determining levels using the proposed method may not be perfect, the workflow proposed by the present invention may provide a UI for enabling a user, which is a medical expert, to change a level of the airway whose levels have been determined by an automated method.

Figure 10:
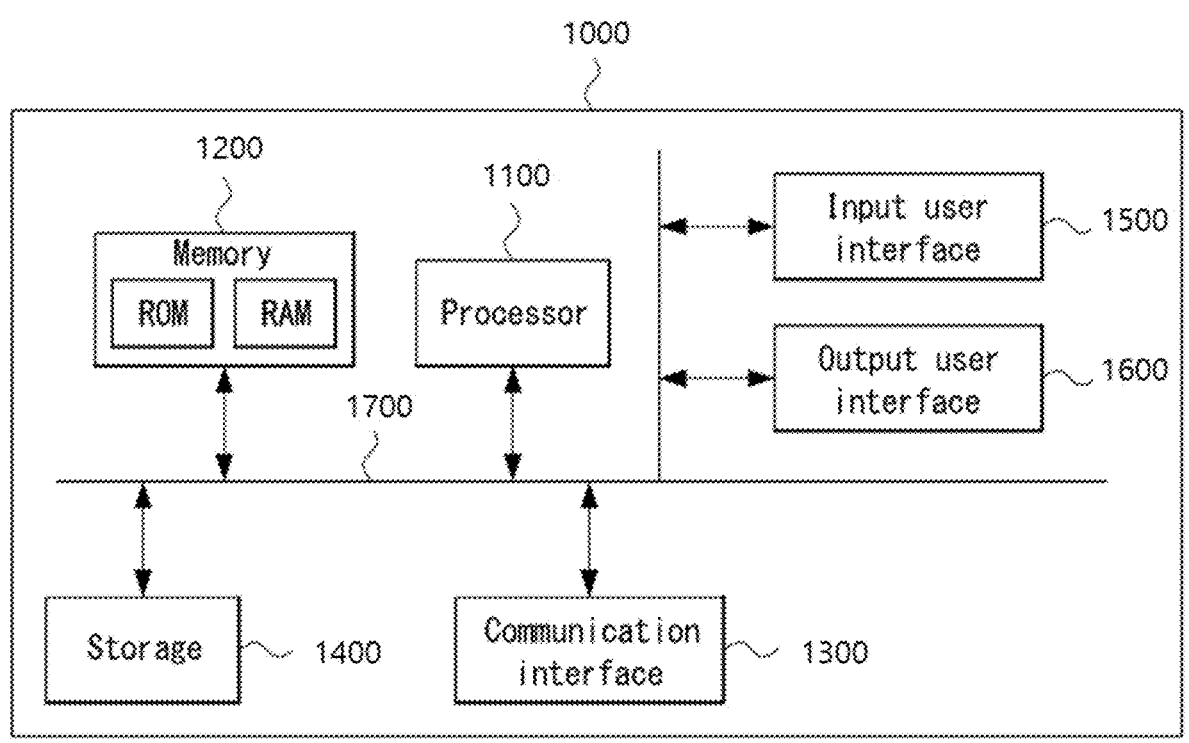
FIG. 10 is a conceptual diagram showing an example of a generalized medical image analysis apparatus, an airway region level determination apparatus, or a computing system capable of performing at least a part of the processes of FIGS. 1 to 9.

FIG. 10 is a conceptual diagram showing an example of a generalized medical image analysis apparatus, an airway region level determination apparatus, or a computing system capable of performing at least a part of the processes of FIGS. 1 to 9.

At least some processes of the medical image processing and/or medical image analyzing method according to exemplary embodiments of the present disclosure may be executed by a computing system 1000 of FIG. 10.

As shown in FIG. 10, the computing system 1000 according to an exemplary embodiment of the present disclosure may be configured to include a processor 1100, a memory 1200, a communication interface 1300, a storage device 1400, an input interface 1500, an output interface 1600, and a bus 1700.

The computing system 1000 according to an exemplary embodiment of the present disclosure may include the at least one processor 1100 and the memory 1200 storing instructions instructing the at least one processor 1100 to perform at least one step. At least some steps of the method according to exemplary embodiments of the present disclosure may be performed by the at least one processor 1100 loading the instructions from the memory 1200 and executing them.

The processor 1100 may mean a central processing unit (CPU), a graphics processing unit (GPU), or a dedicated processor on which the methods according to exemplary embodiments of the present disclosure are performed.

Each of the memory 1200 and the storage device 1400 may include at least one of a volatile storage medium and a non-volatile storage medium. For example, the memory

1200 may include at least one of a read only memory (ROM) and a random access memory (RAM).

In addition, the computing system 1000 may include the communication interface 1300 that performs communication through a wireless network.

In addition, the respective components included in the computing system 1000 may be connected by the bus 1700 to communicate with each other.

For example, the computing system 1000 of the present disclosure may be a desktop computer, a laptop computer, a notebook, a smart phone, a tablet PC, a mobile phone, a smart watch, a smart glass, e-book reader, a portable multimedia player (PMP), a portable gaming device, a navigation device, a digital camera, a digital multimedia broadcasting (DMB) player, a digital audio recorder, a digital audio player, a digital video recorder, a digital video player, a personal digital assistant (PDA), and the like having communication capability.

An apparatus for determining the branching levels of a plurality of airway branch segment regions of the airway region according to an embodiment of the present invention may include: memory 1200 configured to store one or more instructions; and a processor 1100 configured to execute the one or more instructions. The processor 1100 executes the one or more instructions to: determine branching levels of a plurality of first airway branch segment regions of the airway region included in a medical image from a root to a first order based on anatomical structure information in steps S410, S440, and S450; and determine branching levels of a plurality of second airway branch segment regions of the airway region from a bottom level to the first order in steps S420, S430, and S460.

When executing the one or more instructions to determine the branching levels of a plurality of first airway branch segment regions of the airway region based on anatomical structure information in steps S410, S440, and S450, the processor 1100 may determine the branching level of a respective airway branch segment region by prioritizing anatomical structure information over whether the respective airway branch segment region of the airway region branches off from the root.

When executing the one or more instructions to determine the branching levels of a plurality of second airway branch segment regions of the airway region from the bottom level to the first order in steps S420, S430, and S460, the processor 1100 may assign a level higher than the same level to a respective airway branch segment region in the direction from a merge point to the root (the higher-level direction) when branch regions of the same level in the airway region meet and merge at the merge point.

When executing the one or more instructions to determine branching levels of a plurality of second airway branch segment regions of the airway region from the bottom level to the first order in steps S420, S430, and S460, the processor 1100 may assign the highest one of different levels to a respective airway branch segment region in the direction from a merge point to the root (the higher-level direction) when branch regions of the different levels in the airway region meet and merge at the merge point.

When executing the one or more instructions to determine branching levels of a plurality of second airway branch segment regions of the airway region from the bottom level to the first order in steps S420, S430, and S460, the processor 1100 may initially assign branching levels of all of the respective airway branch segment regions from the bottom level in the direction toward the root using the stream ordering scheme in step S430, and may adjust the branching levels of a plurality of second airway branch segment regions of the airway region from the bottom level to the first order in step S460 after determining the branching levels of a plurality of first airway branch segment regions of the airway region from the root to the first order based on the anatomical structure information in step S450.

When executing the one or more instructions to determine the branching levels of a plurality of first airway branch segment regions of the airway region based on the anatomical structure information, the processor 1100 may adjust the initially assigned branching level so that the root has a predetermined level value (e.g., "1") in step S440, and may determine the branching levels of a plurality of first airway branch segment regions of the airway region by prioritizing the anatomical structure information in step S450.

The processor 1100 may execute the one or more instructions to generate the results of the quantitative analysis of an anatomical structure for clinical diagnosis for each branching level of the respective airway branch segment regions the airway region.

The processor 1100 may execute the one or more instructions to correct the branching level of a selected airway branch segment region of the airway region in response to a user input to the airway branching level correction menu provided in step S500.

The processor 1100 may execute the one or more instructions to collectively correct the branching level of a selected airway branch segment region of the airway region and the levels of airway branch segment regions having a level lower than or equal to the level of the selected airway branch segment region in response to a user input to the airway branching level correction menu provided in step S500.

According to an embodiment of the present invention, the levels of respective parts (airway branch segments) of the airway consistent with the anatomical structure of the airway may be determined.

According to an embodiment of the present invention, the levels of individual parts (airway branch segments) of the airway are determined based on the results of the segmentation of the airway inside the lungs or during a segmentation process, and the statistical information and/or quantitative information of one or more regions is calculated for each level, thereby enabling clinically useful information to be extracted and used for diagnosis.

According to an embodiment of the present invention, the levels of the respective branch segment of the airway may be determined by a hybrid/modified stream ordering scheme that increases clinical usefulness by using the anatomical structure-based airway level determination method and rapidly determines the levels of respective parts of the airway by using the stream ordering scheme, which is a method of determining the orders of streams.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of determining branching levels of a plurality of airway branch segment regions of an airway region for computer-assisted medical image analysis and diagnosis, the method comprising:
    determining branching levels of a plurality of first airway branch segment regions of an airway region included in a medical image from a root to a first order based on anatomical structure information;
    determining branching levels of a plurality of second airway branch segment regions of the airway region from a bottom level to the first order; and
    generating results of quantitative analysis of an anatomical structure for clinical diagnosis for each branching level of the respective airway branch segment regions of the airway region,
    wherein the determining branching levels of the plurality of second airway branch segment regions of the airway region from the bottom level to the first order comprises:
        assigning a highest one of different levels to a respective airway branch segment region in a direction from a merge point to the root wherein a plurality of airway branch segment regions of the different levels in the airway region meet and merge at the merge point.

2. The method of claim 1, wherein the determining branching levels of the plurality of the first airway branch segment regions of the airway region based on the anatomical structure information comprises determining a branching level of a respective airway branch segment region by prioritizing the anatomical structure information over whether the respective airway branch segment region of the airway region branches off from the root.

3. The method of claim 1, wherein the determining branching levels of the plurality of first airway branch segment regions of the airway region based on the anatomical structure information comprises determining a branching level of a respective airway branch segment region based on the anatomical structure information including at least one of an airway radius of the respective airway branch segment region of the airway region, a location of the respective airway branch segment region, or a branching direction of the respective airway branch segment region.

4. The method of claim 1, wherein the determining branching levels of the plurality of second airway branch segment regions of the airway region from the bottom level to the first order comprises assigning a level higher than a same level to a respective airway branch segment region in a direction from a merge point to the root wherein a plurality of airway branch segment regions of the same level in the airway region meet and merge at the merge point.

5. The method of claim 1, further comprising initially assigning a branching level of all of respective airway branch segment regions from the bottom level in a direction toward the root using a stream ordering scheme,
    wherein the determining branching levels of the plurality of second airway branch segment regions of the airway region from the bottom level to the first order comprises:
        adjusting the branching levels of the plurality of second airway branch segment regions of the airway region from the bottom level to the first order after determining the branching levels of the plurality of first airway branch segment regions of the airway region from the root to the first order based on the anatomical structure information.

6. The method of claim 5, wherein the determining branching levels of the plurality of first airway branch segment regions of the airway region based on anatomical structure information comprises:
    adjusting the initially assigned branching level so that the root has a predetermined level value; and
    determining branching levels of the plurality of first airway branch segment regions of the airway region except for the root by prioritizing the anatomical structure information.

7. The method of claim 1, further comprising:
    segmenting an organ in the medical image; and
    performing skeletonization on an organ segmentation image,
    wherein the determining branching levels of the plurality of the first airway branch segment regions and the determining branching levels of the plurality of the second airway branch segment regions is performed based on a skeletonization image.

8. The method of claim 1, further comprising providing an airway branching level correction menu for a preliminary result image in which the branching levels of the plurality of second airway branch segment regions of the airway region have been determined from the root to the bottom level.

9. The method of claim 8, wherein the airway branching level correction menu is a menu for correcting a branching level of a selected airway branch segment region of the airway region.

10. The method of claim 8, wherein the airway branching level correction menu is a menu for collectively correcting a branching level of a selected airway branch segment region of the airway region and branching levels of airway branch segment regions having a level lower than or equal to the level of the selected airway branch segment region.

11. An apparatus for determining branching levels of a plurality of airway branch segment regions of an airway region for computer-assisted medical image analysis and diagnosis, the apparatus comprising:

> memory configured to store one or more instructions; and
> a processor configured to execute the one or more instructions;
> wherein the processor is further configured to execute the one or more instructions to:
>> determine branching levels of a plurality of first airway branch segment regions of an airway region included in a medical image from a root to a first order based on anatomical structure information;
>> determine branching levels of a plurality of second airway branch segment regions of the airway region from a bottom level to the first order; and
>> generate results of quantitative analysis of an anatomical structure for clinical diagnosis for each branching level of the respective airway branch segment regions of the airway region, and
> wherein the processor is, for determining branching levels of the plurality of second airway branch segment regions of the airway region from the bottom level to the first order, further configured to:
>> assign a highest one of different levels to a respective airway branch segment region in a direction from a merge point to the root wherein a plurality of airway branch segment regions of the different levels in the airway region meet and merge at the merge point.

12. The apparatus of claim 11, wherein the processor is further configured to determine a branching level of a respective airway branch segment region of the plurality of the first airway branch segment regions by prioritizing the anatomical structure information over whether the respective airway branch segment region of the airway region branches off from the root.

13. The apparatus of claim 11, wherein the processor is further configured to assign a level higher than a same level to a respective airway branch segment region in a direction from a merge point to the root wherein a plurality of airway branch segment regions of the same level in the airway region meet and merge at the merge point.

14. The apparatus of claim 11, wherein the processor is further configured to:

> assign initially a branching level of all of respective airway branch segment region from the bottom level in a direction toward the root using a stream ordering scheme;
> adjust the initially assigned branching level so that the root has a predetermined level value;
> determine branching levels of the plurality of first airway branch segment regions of the airway region by prioritizing the anatomical structure information; and
> adjust branching levels of the plurality of second airway branch segment regions of the airway region from the bottom level to the first order after determining the branching levels of a plurality of first airway branch segment regions of the airway region from the root to the first order based on the anatomical structure information.

15. The apparatus of claim 11, wherein the processor is further configured to execute the one or more instructions to correct a branching level of a selected airway branch segment region of the airway region in response to a user input to an airway branching level correction menu.

16. The apparatus of claim 11, wherein the processor is further configured to execute the one or more instructions to collectively correct a branching level of a selected airway branch segment region of the airway region and branching levels of airway branch segment regions having a level lower than or equal to the level of the selected airway branch segment region in response to a user input to an airway branching level correction menu.

* * * * *